Aug. 14, 1934.                H. A. WADMAN                1,970,112
             METHOD AND APPARATUS FOR MAKING GLASS WITH SALT
                           Filed Aug. 10, 1932
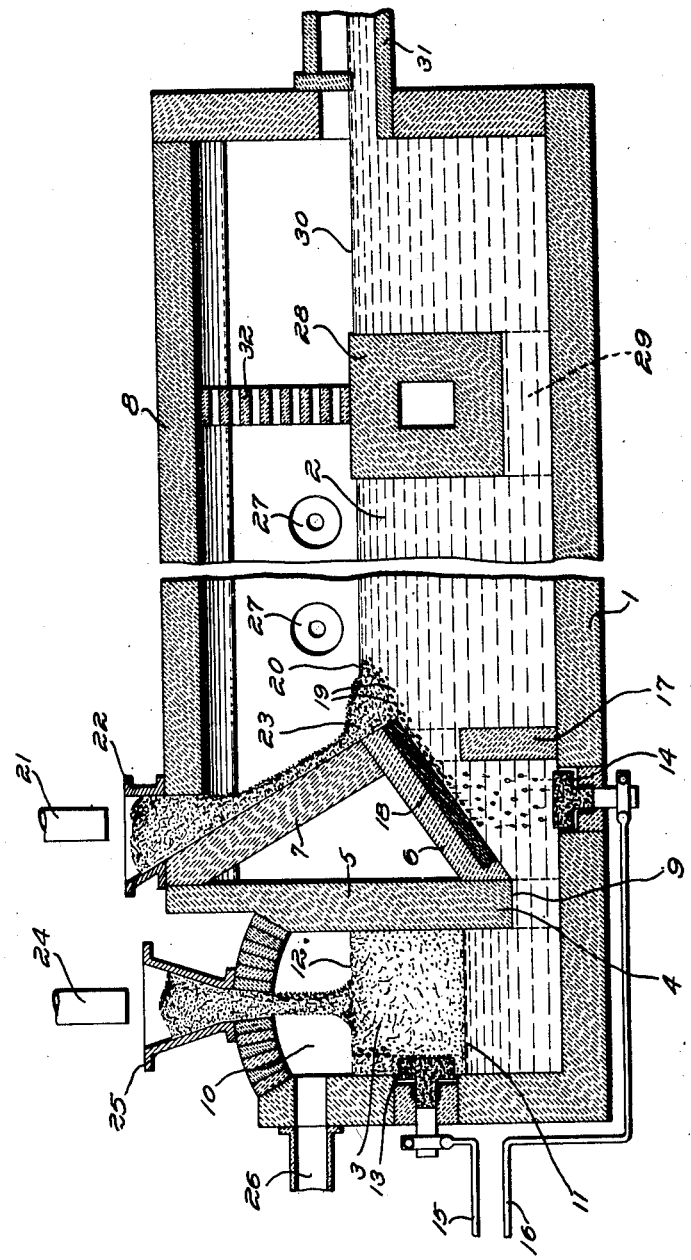
Inventor
Harold A. Wadman
By
Brown & Parham
Attorneys
Witness:
B. X. Bartman Patented Aug. 14, 1934

1,970,112

UNITED STATES PATENT OFFICE 1,970,112

METHOD AND APPARATUS FOR MAKING GLASS WITH SALT

Harold A. Wadman, West Hartford, Conn., assignor to Hartford-Empire Company, Hartford, Conn., a corporation of Delaware Application August 10, 1932, Serial No. 628,114

12 Claims. (Cl. 204—19)

This invention relates to a method and apparatus for making glass, and particularly to the use and construction of a device which produces glass, at least a part of the soda for which is produced by electrolysis starting with some sodium salt, as for example sodium chloride, as a raw material.

In the past, the soda or fluxes have been supplied in the making of glass in the form of soda ash ($Na_2CO_3$) or salt cake ($Na_2SO_4$), or both. Fluxes supplied in these forms are relatively expensive, and constitute one of the most expensive ingredients of the batch used to make the desired glass. At present, these fluxes cost in the neighborhood of fifteen dollars a ton.

One of the objects of this invention, therefore, is to provide a method and means for using a cheaper raw material in the manufacture of glass, and thereby to reduce the cost of glass-making to a material extent. This product is common salt, or sodium chloride (NaCl), which is obtainable at prices in the neighborhood of five dollars a ton.

The invention also contemplates the recovery of the by-product, chlorine, in any suitable manner, which may be done according to the present invention, as it is liberated in a chamber separated from the main glass-making chamber. The sale of the by-product will serve additionally to decrease the cost of glass-making according to my present invention.

A further object of the invention is to provide suitable means for carrying out the aforementioned process in an efficient and economical manner, and one in which means are provided for minimizing the wear on the container in which the process is carried on, both from mechanical action and chemical erosion.

A further object of the invention is to utilize as great a proportion of the heat generated by the oxidation of the sodium as possible in the melting of the other glass-making ingredients and in the refining of the glass, thus conserving the heat and/or energy which must be supplied in carrying out the process.

Further objects and advantages of the present invention will become apparent from a reading of the following specification and sub-joined claims, when taken in connection with the accompanying drawing, in which:

The single figure illustrates in vertical section an apparatus in which my process may be carried out.

In the past, it has been proposed to produce metallic sodium by electrolysis of common salt. This process has not been commercially successful as far as is known, and is not now in general commercial use, due to various difficulties, most, if not all, of which disappear when using my present process in which the sodium is used in the manufacture of glass in partial or complete substitution for the fluxes as soda ash or salt cake, or both, in the batch. Perhaps the chief difficulty experienced in the prior art in the production of metallic sodium by the electrolysis of sodium chloride is the necessity in those processes for preventing oxidation of the sodium by combination with either oxygen of the air or other materials or compounds by which the sodium may be oxidized due to its very great chemical activity. According to my present invention, it is desired that the sodium be oxidized prior to its combination with the other glass-making ingredients in the making of glass, so that the difficulty of the prior art disappears.

A further difficulty in the prior art has been the high cost of current, much of which is dissipated as heat in the bath. The difficulty also substantially disappears, as it is desired in the instant case to use heat in relatively large amounts for maintaining the bath at the desired temperature and for heating the glass-making ingredients up to that temperature and fusing them. Thus, it will be seen that the prior art difficulties practically disappear, or turn into advantages, according to my present process.

Referring now to the drawing, there is shown a container 1 for a bath including molten glass 2 and fused salt 3, this container including the usual bottom and side walls. Intermediate the length of the container is provided a dividing wall structure, generally indicated at 4 and including a vertical wall 5, an inclined wall 6 beneath the surface of the bath 2 of glass, and an inclined wall 7 extending from the end of the wall 6 up to the roof arch 8 of the portion of the container to the right of the wall 4, as seen in the drawing. The interior of the wall 4 may be hollow as shown, the cavity communicating with the atmosphere or being supplied with a cooling medium as desired. The dividing wall 4 terminates at a level, as shown at 9, somewhat above the bottom of the container 1, thus providing a through passage for the materials of the bath beneath the wall 4. The chamber or portion of the container 1 at the left of the wall 4 may be considered as an anode chamber 10. In this chamber the glass is shown as rising to a level 11 which may be considered the normal level for the glass in the chamber 10. Above the level 11 in the anode chamber is the layer of fused salt 3, which is maintained up to a level substantially as shown at 12. An anode 13, which may be of graphite, is mounted in any suitable manner in the side wall of the container 1 and is in contact with the fused salt layer 3. The portion of the container to the right of the dividing wall 4, as seen in the drawing, may be considered a cathode chamber, and is provided with a cathode 14 mounted in the bottom of this chamber just to the right of the lower portion of the dividing wall 4. Any suitable material may be used for the cathode, one such material which I contemplate for use being graphite. Direct current is conducted to the anode 13 and cathode 14 through the bus bars or conductors 15 and 16 respectively from any suitable source. This current is preferably maintained at a low potential and a relatively high amperage, the amperage being determined by the dimensions of the anode and cathode, so that the current density on the surface of the electrodes shall not exceed seven to eight amperes per square centimeter. Higher current density than this would be likely to cause a gaseous film to form on the anode, across which the current would have to jump in the form of an arc, thus providing a sort of glow which might also be accompanied by a loss of weight of the cathode due to the formation of some chloride of carbon, as $CCl_4$.

Inasmuch as the voltage which must be used in carrying out my method is a function of the dimensions of the apparatus in which the method is to be carried out, I have not given any specific numerical values. These values may, however, be calculated by any one skilled in the art, starting with the required voltage necessary for the electrolysis or disassociation of salt, which is 3.81 volts. This is a matter of common engineering knowledge. To this must be added a sufficient voltage to overcome the resistance of the bath, which is of course a function of the dimensions of the path between the two electrodes used. The total voltage to be used in carrying out the method can therefore be calculated by any one skilled in the art once the desired dimensions of the device have been fixed.

The amperage used which, as mentioned above, should not exceed 7 to 8 amperes per square centimeter and may in some constructions be as low as 0.3 amperes per square centimeter. As above set forth, it is desirable to maintain a relatively low current density, so as to prevent arcing and any other undesirable results. The actual amperage to be chosen will depend to a major extent upon the amount of soda which is to be supplied in view of the rate of melting of the batch and consequent rate of making of glass, and also on the composition of the glass desired to be made. The voltage being fixed as above set forth, the rate of making of soda, and thus the rate of supply of soda to the bath for combination with the batch material used, will depend directly upon the amperage impressed upon the electrodes.

As shown in the drawing, just to the right of the cathode 14 there is an upstanding wall or baffle 17 projecting from the floor of the container upwardly to within a short distance of the lower surface of the inclined wall 6. This serves to confine the path of current between the anode and the cathode, and also to assist in the maintenance of a different temperature in the portion of the chamber between the anode and the cathode from the other portions of the bath, for instance, those at the right of the point at which the glass-making materials are melting where refining of the glass takes place. It is desired that the salt layer 3 be maintained at a temperature but slightly above the melting point of salt (1482° F.), as salt has a tendency to sublime at temperatures slightly above its melting point, and it is desired that this tendency be reduced as far as possible. In carrying out this purpose, it is desired that the temperature in the glass beneath the salt bath 3 be maintained but slightly above that of the salt bath, the temperature of which has been given above as 1482° F. Furthermore, it is desired to keep the temperature in the path of the direct current and in the path of the sodium rising from the cathode 14 as low as possible, so that the vaporization of the sodium will be reduced to a minimum, and so that the sodium may rise to the surface due to its low specific gravity with respect to that of glass in the form of a liquid with a minimum of vapor. This tends to prevent the formation of a "metal fog", which is harmful to the proper carrying out of the desired reactions.

The lower portion of the wall 6 above the cathode 14 is preferably faced with a material chemically neutral to sodium, such for example as graphite, the layer being indicated at 18 on the drawing. The sodium rising to the surface will pass, as shown in the drawing as the bubbles 19 and will oxidize at the surface, substantially at the point 20. Glass-making ingredients, which will be substantially the desired batch for making glass of the composition to be made, less at least a part of the soda usually employed with such a batch, will be fed through the chute 21 and hopper 22 down the inclined wall 7, as illustrated, and will collect in a pile, as shown at 23, intermediate the point 20 at which the sodium is oxidized and the nearest wall of the tank, which is the juncture of the wall portions 6 and 7 of the dividing wall 4. Thus, the batch fed in will serve to protect the walls of the container and the dividing wall 4 from the chemical erosive action of the sodium and its oxidation products, and also the heat evolved by the oxidization of the sodium will be effective to supply at least a part of the heat for melting the batch and for making glass.

Salt may be fed to the anode chamber 10 through the chute 24 and hopper 25 at the desired rate to keep the salt layer 3 up to the desired level 12, as indicated in the drawing.

An outlet duct 26 is provided from the anode chamber 10 above the level 12 at which the salt bath is maintained for the removal of the chlorine liberated in the anode 13. The chlorine may either be compressed and sold as liquid chlorine, or it may be passed into a bath of lime for the production of bleach.

The portion of the container 1 to the right of the wall portions 6 and 7 and the baffle member 17 may be provided with means for raising the temperature of the bath therein to the desired point for refining the glass, such means in the present instance being indicated as burner openings 27 through which fluid fuel may be introduced for providing the desired temperature of the bath. It is contemplated that the temperatures in the refining zone 2 of the bath be maintained substantially the same as those now generally used in commercial practice in the refining of glass, that is, temperatures of the order of magnitude of 2650° F. These temperatures are well known in the glass making art and are not per se a matter of invention in the present application. Suitable means (not shown) may be provided for the exhaust of the waste gaseous products of combustion.

A bridge wall 28 is illustrated extending between the sides of the tank and providing a submerged throat 29 therebeneath connecting the portions of the bath at opposite sides thereof. Intermediate the bridge wall 28 and roof arch 8 of this portion of the tank, there may be provided a shadow wall 32 for partially heat-separating the various portions of the tank above the normal level 30 of the glass therein. Glass may be flowed through a passage 31 to any suitable device by which it may be used, such for example as a draw pot, suction gathering pool, or an automatic feeder, in any manner well known in the art, the use to which the glass is put forming no part of the present invention.

Taking up now the chemical actions taking place within the device, it will be understood that the salt will first be ionized, according to the equation $NaCl = Na^+ + Cl^-$. The ions will then migrate through the bath, the chlorine ions migrating to the positive electrode or anode 13, and the sodium ions migrating to the negative electrode or cathode 14. At the positive electrode or anode the following will take place:

$$Cl^- + (+) = Cl$$
$$2Cl = Cl_2.$$

The chlorine gas thus liberated at the anode will be evolved as a gas, and will pass from the chamber 10 through the passage 26 to any point at which the chlorine may be utilized or compressed for transportation to a point of utilization in liquid form.

At the negative electrode or cathode, the following reaction will take place:

$$Na^+ + (-) = Na$$

If any water be present, even in very small or minute quantities in the glass, the sodium may be oxidized at or adjacent to the electrode according to the equation:

$$2Na + H_2O = Na_2O + H_2$$

the hydrogen being given off as a gas and burning at the surface to form water if any oxygen be present in the atmosphere above the bath, as would presumably be the case.

This reaction will probably be a relatively minor factor, however, and by far the major part of the sodium liberated at the cathode will pass to the surface of the bath, due to its relatively low specific gravity with respect to that of the glass and in the form of liquid and/or vaporized sodium. As above stated, however, the temperature at this portion of the tank will preferably be maintained such that a minimum of vaporized sodium will be formed, and that the major portion of the sodium will pass to the surface as a liquid in tiny bubbles as illustrated at 19. At the surface and substantially at the point 20 illustrated on the drawing, the sodium will be oxidized either by combination with oxygen or with carbon dioxide, or both, according to the following equations:

$$4Na + O_2 = 2Na_2O$$
$$2Na + CO_2 = Na_2O + CO$$

It is contemplated, according to this invention, to provide an atmosphere above the glass rich in carbon dioxide in order that the second of the above equations may take place to a material extent, and thus diminish the violence of the oxidation reaction as a portion of the heat energy liberated by the oxidation of the sodium will be absorbed immediately by the breaking down of the carbon dioxide to carbon monoxide. In any event, the heat liberated by the oxidization of the sodium will be effective to assist, at least, in the melting of the batch which is supplied closely adjacent to the point at which the sodium oxidizes. Thus a minimum of energy input is required in carrying out the process and a maximum proportion of the heat and/or energy input is utilized in performing useful work in the making of glass.

In this case, whenever the "oxidization" or "oxidizing" of the sodium is referred to, these expressions are intended to be construed not strictly as the combination of sodium with oxygen, but rather as the increase of the positive valence of sodium from a valence of zero in its metallic state to a valence of 1 in its combined state. Thus, for example, should sodium be converted directly to sodium carbonate ($Na_2CO_3$), this conversion is to be construed as oxidization of the sodium.

Furthermore, in this case there is mentioned "salt", referring particularly to sodium chloride. It is contemplated, however, that any halide of sodium may be used and that the word "salt" be construed as meaning any halide of sodium, wherever it occurs in the specification or claims.

Furthermore, this case refers to the making of "glass", intending by that to mean not necessarily "glass" in its limited sense, but any similar material which may be made in the manner indicated by the fusion of ingredients including a flux having soda as its basis. One such material, for example, which is to be considered as within the purview of this invention is water glass. Others include vitreous enamels, etc.

While I have shown and described but one form of apparatus in which my process may be carried out, it will be understood that other types of apparatus may be employed and minor changes may be made in the method or apparatus within the scope of the appended claims, which are to be construed as broadly as the state of the prior art permits.

I claim:

1. The method of making glass, which comprises passing a direct current of electricity between an anode and a cathode in contact with a bath including molten glass and fused salt to liberate sodium at the cathode, oxidizing the liberated sodium, supplying to the bath glass making ingredients of such kind and proportion that when fused with the oxidized sodium will produce glass of the desired composition, and completing the making of the glass by refining said glass making ingredients and the oxidized sodium in said bath.

2. The method of making glass, which comprises passing a direct current of electricity between an anode and a cathode in contact with a bath including molten glass and fused salt to liberate sodium at the cathode, maintaining the portion of the bath adjacent to the cathode at a temperature such that the liberated sodium will move either in liquid or gaseous form to the surface of the bath, oxidizing the liberated sodium at the surface of the bath, supplying to the bath at a point adjacent to that at which the sodium is oxidized glass making ingredients of such kind and proportion that when fused with the oxidized sodium will produce glass of the desired composition, whereby the heat evolved due to the oxidation of the sodium will be effective at least in part to supply the heat for the melting of the glass making ingredients, and completing the making of the glass by refining said glass making ingredients and the oxidized sodium in said bath.

3. The method of making glass, which comprises passing a direct current of electricity between an anode and a cathode in contact with a bath including molten glass and fused salt to liberate sodium at the cathode, maintaining the temperature of the bath adjacent to the cathode such that the sodium there liberated will go to the surface of the bath in a liquid or vapor form, oxidizing the sodium at the surface of the bath in an atmosphere high in carbon dioxide to diminish the violence of the oxidation reaction, supplying to the bath glass making ingredients of such kind and proportion that when fused with the oxidized sodium will produce glass of the desired composition, and completing the making of the glass by refining the glass making ingredients and oxidized sodium in said bath.

4. The method of making glass, which comprises passing a direct current of electricity between an anode and a cathode in contact with a bath including molten glass and fused salt to liberate sodium at the cathode, oxidizing the liberated sodium substantially at the surface of the bath with carbon dioxide substantially according to the equation $2Na+CO_2=Na_2O+CO$, supplying to the bath glass making ingredients of such kind and proportion that when fused with the oxidizing sodium will produce glass of the desired composition, and completing the making of the glass by refining said glass making ingredients and the oxidized sodium in said bath.

5. The method of making glass from salt and recovering by-products, which comprises passing a direct current of electricity between an anode and a cathode in contact with a bath including molten glass and fused salt to liberate chlorine at the anode and sodium at the cathode, partially separating portions of the bath adjacent to the anode and cathode from each other to prevent passage therebetween of the products of the electrolysis while permitting migration therebetween of ionized sodium and chlorine, conducting the chlorine produced at the anode away from the bath to a point at which it may be recovered, oxidizing the sodium liberated at the cathode at the surface of the bath, supplying to the bath glass making materials of such kind and proportion that when fused with the oxidizing sodium will produce glass of the desired composition, the glass making ingredients being supplied closely adjacent to that portion of the bath at the surface of which the sodium is oxidized, whereby to utilize at least a part of the heat liberated by the oxidation of the sodium in the melting of the glass making ingredients, and completing the making of the glass at a point removed from the portion of the bath at which the sodium is oxidized and at a higher temperature by refining the glass making ingredients and oxidized sodium.

6. The method of making glass, which comprises passing a direct current of electricity between an anode and a cathode in contact with a bath including molten glass and a fused salt to liberate sodium at the cathode, oxidizing the liberated sodium at the surface of the bath, supplying to the bath glass making ingredients of such kind and proportion that when fused with the oxidized sodium will produce glass of the desired composition, the supply of the glass making ingredients being between the point at which the sodium will oxidize and the nearest wall of the container for the bath, whereby to protect the walls of the container from the corrosive action of the sodium and its oxidation products and to utilize at least a portion of the heat liberated by the oxidation of the sodium in the melting of the glass making ingredients, and completing the making of the glass by refining said glass making ingredients and the oxidized sodium in a portion of the bath spaced laterally from the point at which the sodium is oxidized and at a higher temperature than that portion of the bath through which the direct current passes.

7. Apparatus for making glass, comprising a container for a bath including molten glass and fused salt in contact one with the other, means including an anode and a cathode for passing a direct current of electricity through a portion of the bath in a path passing through the fused salt and for thereby liberating sodium at the cathode, means providing for the oxidation of the sodium so liberated, means for supplying to the bath glass-making ingredients of such kind and proportion that when fused with the oxidized sodium will produce glass of the desired composition, and means for refining the glass produced by the fusion.

8. Apparatus for making glass, comprising a container for a bath including molten glass and fused salt in contact one with the other, means including an anode and a cathode for passing a direct current of electricity through a portion of the bath in a path passing through the fused salt and for thereby liberating sodium at the cathode, means for oxidizing the sodium so liberated at the surface of the bath, means for supplying to the bath adjacent to the point at which the sodium oxidizes glass-making ingredients of such kind and proportion that when fused with the oxidized sodium will produce glass of the desired composition, and means for refining the glass produced by the fusion.

9. Apparatus for making glass, comprising a container for a bath including molten glass and fused salt in contact one with the other, means including an anode and a cathode for passing a direct current of electricity through a portion of the bath in a path passing through the fused salt and for thereby liberating sodium at the cathode, means providing for the oxidation of the sodium so liberated at the surface of the bath, means for supplying to the bath at a point intermediate the point at which the sodium is oxidized and the nearest side wall of said container glass-making ingredients of such kind and proportion that when fused with the oxidized sodium will produce glass of the desired composition, and means for refining the glass so produced.

10. Apparatus for making glass, comprising a container for a bath including molten glass and fused salt in contact one with the other, the bath normally being maintained up to a predetermined level in the container, a division wall projecting down into the bath in the container beneath the normal level thereof for dividing the container into an anode chamber and a cathode chamber communicating with one another beneath the level of the lower portion of said division wall, an anode in the anode chamber and a cathode in the cathode chamber for passing a direct current of electricity through the bath in these chambers, means for supplying salt to the anode chamber to maintain the level of the fused salt in this chamber above the anode therein, means for supplying to the cathode chamber glass-making ingredients of such kind and proportion that when mixed with oxidized sodium will produce glass of the desired composition, and means for refining the glass so produced, whereby the dividing wall will be effective to prevent passage between the anode and cathode chambers of the products of the electrolysis while permitting migration of the ions between these chambers.

11. Apparatus for making glass, comprising a container for a bath of molten glass and fused salt in contact one with the other, a dividing wall projecting into the bath to divide the container into an anode chamber and a cathode chamber communicating with one another between the lower portion of the dividing wall and the bottom of said container, means for supplying salt to the anode chamber and for thereby maintaining the bath of fused salt in said chamber above the lower level of the dividing wall, an anode in the anode chamber in contact with the bath of fused salt, a cathode in the lower portion of the cathode chamber, means for supplying a direct current of electricity to the bath through said anode and said cathode and for thereby liberating sodium at said cathode, means for supplying to the cathode chamber glass-making ingredients of such kind and proportion that when fused with the oxidized sodium will produce glass of the desired composition, means for protecting at least a portion of the dividing wall beneath the surface of the bath in the cathode chamber from the corrosive action of the sodium liberated at the cathode by providing the wall with a surface layer of material chemically neutral to sodium, and means for refining glass so produced.

12. Apparatus for making glass, comprising a container for a bath including molten glass and fused salt in contact one with the other, a dividing wall projecting downwardly into the bath in such container to a level adjacent to the bottom thereof to divide said container into an anode chamber and a cathode chamber, means for supplying salt to said anode chamber and for thereby forming a layer of fused salt above the glass in said chamber, an anode mounted in the side wall of said container in said anode chamber and in contact with the layer of fused salt beneath the normal level at which the salt layer is maintained, a cathode mounted in the bottom of the container in the cathode chamber, means for supplying a direct current of electricity to said anode and said cathode and for thereby liberating chlorine at said anode and sodium at said cathode, said dividing wall having an upwardly inclined portion substantially above said cathode for directing the sodium rising therefrom away from said anode chamber, a layer of graphite built into the inclined portion of said guiding wall for preventing corrosion thereof by the sodium rising into contact therewith, means for supplying to said bath in said cathode chamber glass-making ingredients of such kind and proportion that when combined with the oxidized sodium at the surface of the bath will produce glass of the desired composition, the last-named means being so located as to direct the glass-making ingredients into the bath at a position intermediate the point on the surface thereof at which the sodium will oxidize and the adjacent surface of the dividing wall, whereby to protect said wall from corrosion by the sodium and the oxidization products thereof and whereby to use at least a portion of the heat evolved by the oxidation of the sodium in the melting of glass-making ingredients, and means associated with said container in a zone spaced laterally from the point therein at which the sodium will oxidize for supplying additional heat to the bath and for thereby raising its temperature for refining the glass produced by the fusion of the supplied glass-making ingredients and oxidized sodium.

HAROLD A. WADMAN.